Nov. 27, 1945.         C. E. COX         2,389,957
FLOWMETER
Filed Sept. 13, 1943         3 Sheets-Sheet 3
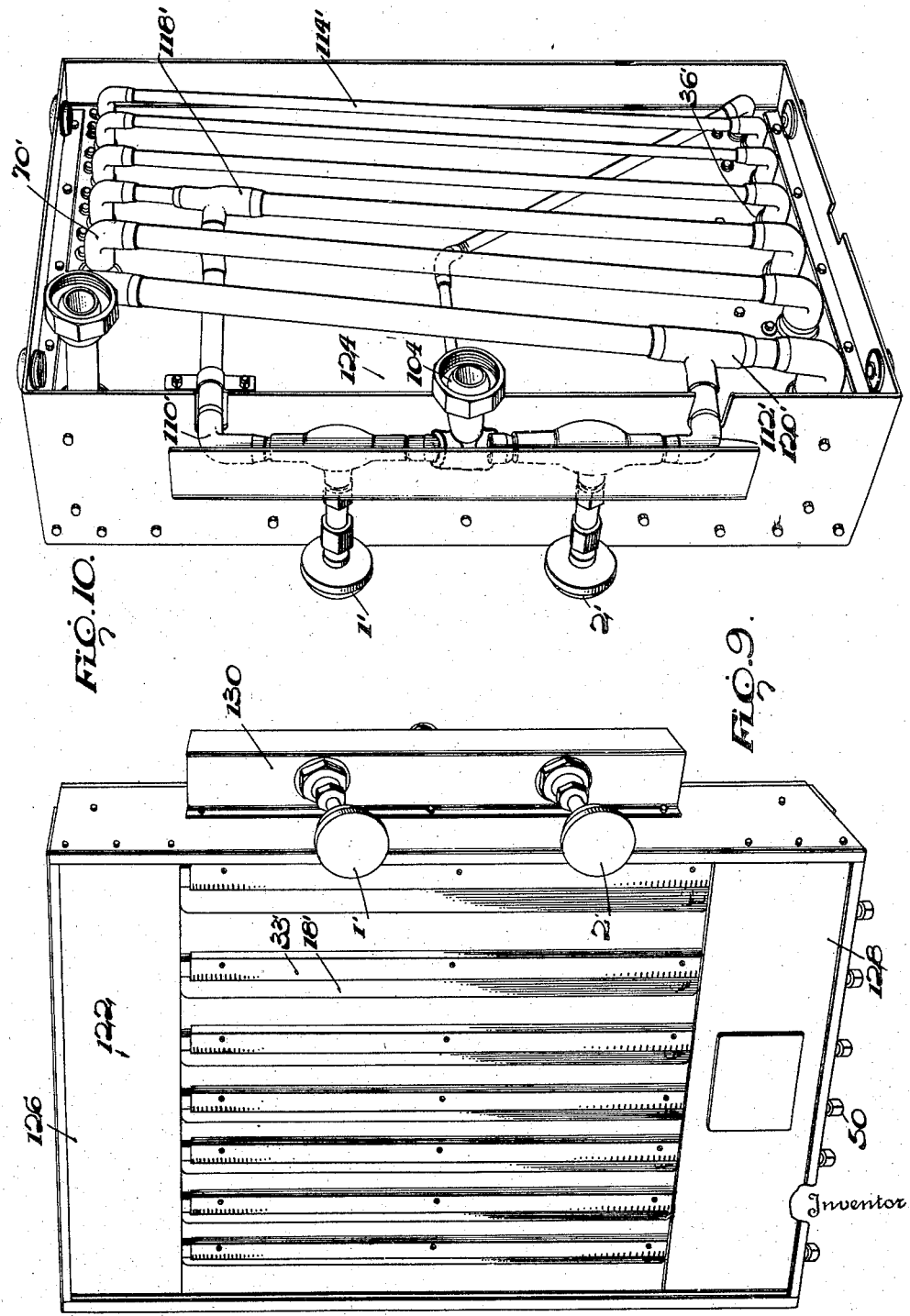

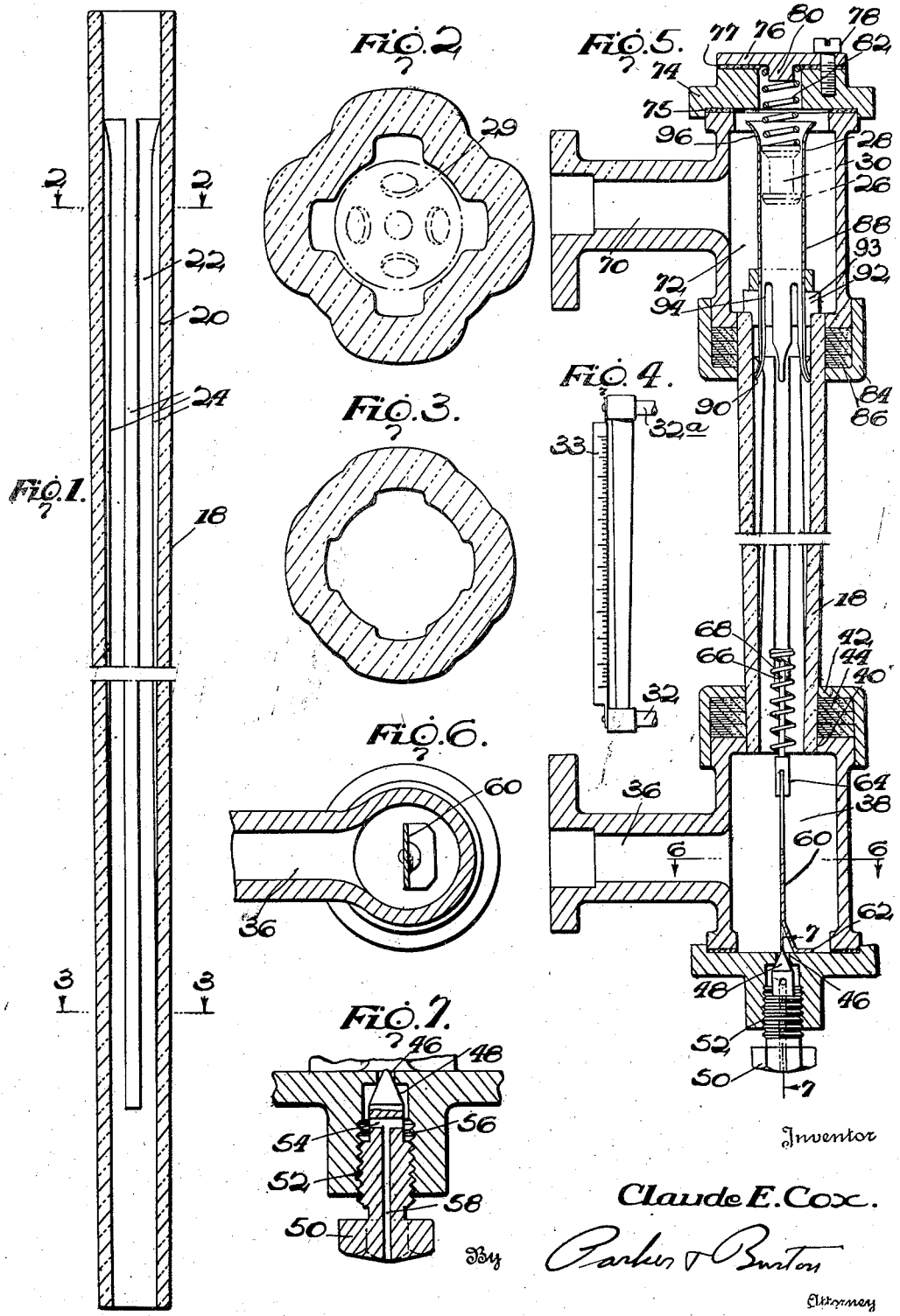

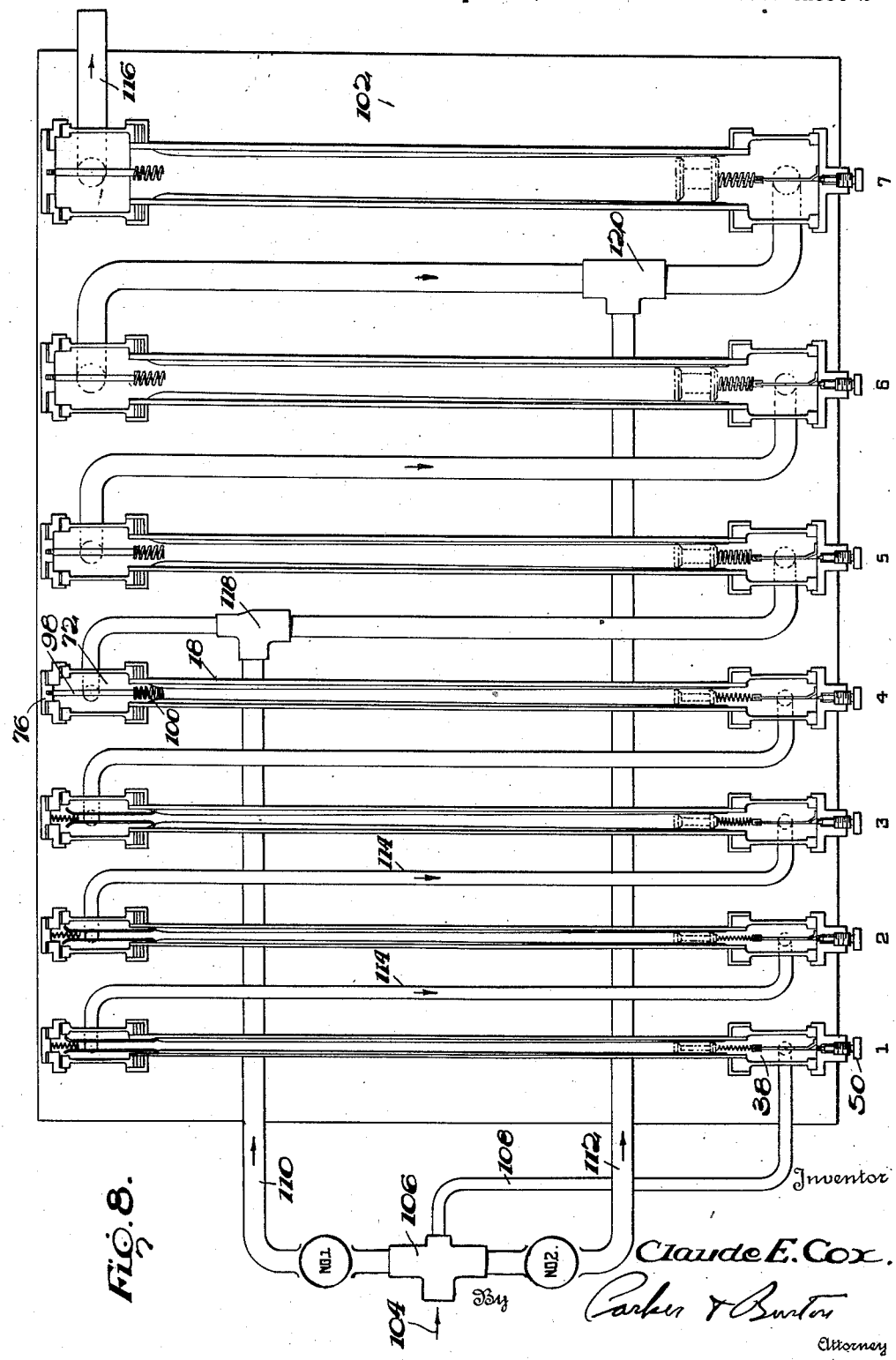

Patented Nov. 27, 1945

2,389,957

UNITED STATES PATENT OFFICE 2,389,957

FLOWMETER

Claude E. Cox, Detroit, Mich.

Application September 13, 1943, Serial No. 502,168

9 Claims. (Cl. 73—197)

This invention relates to an improved fluid flow indicator and is a continuation in part of my application Serial No. 427,759, filed January 22, 1942. An object is to provide a fluid flow indicator which is simple, compact, accurate, and adapted for ease of operation and reading.

Another object is the provision of a fluid flow indicator capable of use to measure fluid flow of substantial volume and fluid flows that vary over a wide range, and wherein a plurality of flow meter tubes are arranged in series and each tube is in the form of a transparent tube having a tapered bore and provided with a plurality of linearly extending lands spaced apart circumferentially of the bore, which lands extend in parallelism to the axis of the tube and are spaced equidistant radially therefrom throughout the operative length of the tube.

The series of flow meter tubes are connected in a fluid flow line so that the fluid, the flow rate of which is to be measured, enters at the small end of the bore of each tube and flows upwardly through the tube. A float indicator is mounted within each tube and is responsive to the flow of the fluid through the tube, the float indicator being guided in its movement through the tube by the lands.

Each tube is transparent so that the indicator float mounted therein is readily visible for direct reading against a scale as the float moves through the tube. Such a tube may be formed of glass or other suitable transparent material answerable to the requirements of its use. The float indicator is so constructed and so mounted within the tube as to prevent wobble or tilting of the indicator float during its travel within the bore. This assures accuracy of measurement.

Such a fluid flow indicator is particularly useful in research work, such as measuring the fuel consumed by automotive type engines and for calibrating automotive carburetors. The scale may be calibrated to read in pounds or gallons per hour, or as desired, and preferably the scale is in logarithmic form.

A plurality of such tubes are arranged in series in a bank giving the device a wide range as to the volume which may be measured. Each tube is individually calibrated and the change-over from one tube to the other may be automatic. A plurality of the tubes may be coupled for one stage and the succeeding stage may go into action automatically when the capacity of the preceding stage has been reached.

An important feature is that the device is so constructed that a single instrument may be employed to measure fluid flows varying from a very small flow to a very large flow, which would cover the entire operating range of an instrument the capacity of which was being measured from minimum to maximum operating demands, and wherein the change over from one tube to the succeeding tube in series is automatic but means is provided to augment the flow from the source through a succeeding tube or stage of tubes over the amount of fluid passed through the preceding tubes of lesser diameter. With such an arrangement a series of readings at any desired spacing of intervals from minimum to maximum flow may be taken from a single hook-up of the instrument in the line and during a single period of operation. This may vary over a range from one to seven hundred gallons per hour. Each tube is constructed to permit the measuring float to rise beyond the maximum indication on the scale for such tube permitting the fluid to flow therefrom into the succeeding tube in the series without restriction by the float in the preceding tube and overlap of calibration marks on the scale is provided so that movement of the floats may be observed continuously throughout the complete range desired.

Other objects, advantages, and meritorious features of the invention will more fully appear from the following specification, appended claims, and accompanying drawings, wherein:

Figure 1 is a vertical sectional view through an upright fluid flow indicator tube embodying this invention;

Figs. 2 and 3 are horizontal sections taken, respectively, along lines 2—2 and 3—3 of Fig. 1;

Fig. 4 is a reduced view of a fluid flow indicator embodying this invention showing a measuring scale disposed alongside of the tube on which the position of the float indicator within the tube may be read;

Fig. 5 is a vertical sectional view showing an installation of one of the smaller capacity tubes comprising the banks illustrated in either Fig. 8 or 9;

Fig. 6 is a section along 6—6 of Fig. 5;

Fig. 7 is a section along 7—7 of Fig. 5;

Fig. 8 illustrates one embodiment of a bank of indicator tubes forming a multi-stage flow indicator, and Figs. 9 and 10 are front and rear perspectives, respectively, of a different embodiment of the multi-stage arrangement.

Each improved fluid flow indicator tube 18 may be formed of glass or other suitable transparent material. It has a bore 20 which is tapered from top to bottom of a fluted portion. The fluted portion is provided with a plurality (four are here shown) of lands 22 which extend linearly of the tube and are equally spaced circumferentially about the bore as shown in Figs. 2 and 3. These lands are separated by flutes 24.

The flutes establish the taper of the bore, as may be seen from Figs. 2 and 3, and the line indicating the bore in Fig. 1, which line is along the bottom of the flutes. This taper is accurately formed though it may have straight sides or sides so curved as to give a calibration curve of logarithmic form. The latter is preferred. The interior surfaces of the lands, however, are accurately formed parallel to the axis of the tube and spaced equidistant therefrom. The faces of the lands therefore constitute linear segments of a cylinder whose axis corresponds with the axis of the bore while the bottoms of the flutes form linear segments of a truncated cone, straight side or curved as herein set forth, whose axis coincides with the axis of such cylinder and of the bore.

Mounted within the bore of the tube is an indicator float having a float body 26 (see particularly Figs. 2 and 5) which carries a disc 28, apertured as at 29, supported thereabove upon a relatively short stem 30. The float body 26 and disc 28 have diameters which form accurately close but freely sliding engagement with the lands 22 of the bore 20 of the tube so that the float will rise and fall freely within the tube dependent upon the rate of fluid flow upwardly through the tube. The float body or lower disc 26 is continuous and constitutes the metering disc while the upper disc is apertured as at 29 to facilitate free flow of liquid which has passed the lower disc.

The lands so guide the float within the tube that it will not wobble therein and the fluid passageways established by the float within the tube bore relative to the bottoms of the several flutes 24 will constitute segments of a true annulus and will not temporarily assume a crescent shape as would be the case if the float wobbled in its rise and fall. Only through guiding the float to travel along the axis of the bore can accuracy of registration be attained. It will be noted that the tapered bore established by the bottoms of the flutes substantially merges with the lands at the lower end of the tube and the bore extends downwardly therefrom as a cylindrical bore, or it may be tapered as shown in Fig. 5, within which cylindrical portion the float indicator rests when not in use.

When put in use this interiorly fluted tapered tube is mounted in a fluid flow line as indicated by conduits 32 and 32a. Fluid is passed through the line upwardly through the tube. The float indicator rises and falls in response to variations in rate of flow of the fluid passing through the tube. The position of the indicator float within the tube may be read upon the scale 33 in any desired rate of flow measurement with which the scale may be calibrated. Obviously if desired the scale might be etched on the outer surface of the glass tube.

The instrument illustrated comprises a plurality of tubes arranged in series so that flows of substantial volume may be measured. Such an arrangement has been illustrated in Fig. 8 of the drawings and comprises a series of seven tubes increasing successively in size and capacity. Before describing the operation and advantages of the bank arrangement, reference should be made to the particular manner in which the separate tubes are installed to form an integral bank. For this purpose reference is made particularly to Figs. 5, 6, and 7 which illustrate the assembly of tubes Nos. 1, 2 and 3 in the bank arrangement illustrated in Fig. 8. Each tube 18 is supported in a fitting having a fluid inlet passage 36 opening into a chamber 38. The tube is inserted in an opening 40 at the top of chamber 38 and held in place by means of an apertured cap 42 having an opening aligned with the opening in the top of fluid chamber 38 through both of which the tube extends. The cap is press fitted or threaded over the wall of chamber 38 and resilient packing material 44 frictionally retains the tube in position and eliminates the possibility of leakage.

An opening 46 in the base of chamber 38 is normally closed by the tapered seating surface 48 of a valve member 50 threaded into a recess 52 in the bottom of the fitting. Valve member 50 is provided with radial passages 54 opening from the outer surface of a portion 56 of the valve reduced in diameter with respect to the diameter of recess 52, which passages converge and open into an axial passageway 58 extending through valve 50. This arrangement permits readily bleeding each tube of any fluid left therein after an operation, since, when the valve is backed out of its threaded engagement with the fitting, the fluid in the tube passes through opening 46 into recess 52 and thence through passages 54 into the axial passage 58 and out.

A baffle 60 extends vertically through a substantial portion of chamber 38, being secured to the base thereof by means of a foot 62 which is soldered or secured in some other suitable fashion to the base of the chamber. This baffle is of less width than the diameter of the fluid chamber and serves to provide an even flow by eliminating surging of the fluid as it passes up into the indicator tube 18. Secured to the upper part of the baffle in some suitable fashion, as by means of soldering thereto a base plate 64, is a pin 66 which extends somewhat up into tube 18 and serves as a seat for spring 68, thereby providing a resilient bottom stop for the indicator float when the instrument is not in use.

The upper end of tube 18 extends into a fitting substantially like the fitting at the lower end of the tube and including an outlet passage 70 opening from a fluid chamber 72. Closing the opening in the upper end of chamber 72 is an apertured cap 74 which seats upon a gasket 75 and is press fitted over the upper end of the chamber wall. The opening in cap 74 is covered by a closure member 76 which seats upon a gasket 77 surrounding the opening and which may be held down by means of screw 78. The under face of closure member 76 is provided with a projecting lug 80 which extends into the opening of cap 74 and provides a seat for the upper extremity of coil spring 82, which is secured thereto or to the under face of closure member 76 by means of soldering or otherwise. This spring extends down into fluid chamber 72 to thereby provide a resilient upper stop for the indicator float as will be more clearly brought out hereinafter.

Press fitted or threaded over the lower wall of chamber 72 is a cap 84 which, like cap 42, is provided with a central opening in alignment with the opening at the lower extremity of chamber 72. The upper extremity of tube 18 extends through these aligned openings and packing material 86 serves both to retain the upper end of the tube accurately positioned and prevent leakage.

A tubular sleeve element 88, preferably of metal and provided at its lower extremity with spaced expansion fingers 90 which are received within the flutes or grooves 24 of tube 18, is provided with a collar 92 secured in some suitable fashion thereto and provided with a shoulder which seats upon the upper extremity of tube 18, thereby definitely positioning the metal tube 88 longitudinally with reference to the indicator tube 18. The expansion fingers 90 serve to stabilize the gravity support provided by the collar 92. This sleeve serves as a guide for the float and has an internal diameter equal to that of the tube lands.

Collar 92 is secured to tube 88 at such a position as to be in lateral alignment with elongated openings or slots 94 in the wall of tube 88 which lie between the expansion fingers 90 and is provided with openings or cut-away portions 93 registering with slots 94. The upper extremity of tube 88 is flared as indicated at 96 to provide a shield for the lower extremity of coil spring 82.

The diameter of tube 88 corresponds to the maximum diameter of the indicator float and serves as a guide for the same as it moves upwardly through fluid chamber 72 toward the stop provided by spring 82. The expansion fingers 90 are turned at the ends outwardly against the bottoms of the flutes but project inwardly as they extend upwards to form sliding engagement with the float.

From the foregoing description it will be apparent that when the flow in tube 18 is sufficient to carry the indicator float beyond the upper extremity of indicator tube 18 and beyond the upper limit of reading on that particular tube, which position is indicated in Fig. 5, the fluid moving upwardly through the tube will pass through slots 94 and registering openings 93 in collar 92 into the upper fluid chamber 72 and thence through outlet passage 70.

In addition to the unusual accuracy of measurement obtainable by the fluted indicator tube and its associated float, it should be noted that there are numerous advantages in the assembly as a whole and the particular manner in which the various elements are arranged with reference to one another. While the glass of which the transparent indicator tubes 18 are preferably constructed is a particularly hard, smooth and dense surface and therefore does not tend to trap foreign matter which may enter the tube, the transparency of the tube renders such foreign matter easily detectable, and the wall of the indicator float as it moves along the lands which guide its passage up and down the tube, by virtue of the density and hardness of the wall surface is enabled to free the lands of substantially all such foreign matter as may cling thereto.

Despite the unusual efficiency of the arrangement in eliminating inaccuracies by keeping the land surfaces free and clear of foreign matter, such matter ultimately may necessitate disassembly of one or more of the tube assemblies for cleaning purposes. The arrangement disclosed by me is particularly suitable for rapid and facile performance of this operation.

Removal of any of the indicator tubes 18 may be readily accomplished by simply removing cap 74 which covers the upper opening in fluid chamber 72. The guide tube 88 may then be readily withdrawn from such assemblies as contain it and in every assembly the indicator tube may be moved upwardly with ease against the frictional resistance offered by packings 44 and 86, the outer tapered face of the tube wall resulting in decrease of frictional resistance as the tube is moved upwardly. After a slight upward movement there will be no contact whatsoever between the wall of the tube and any part of its supporting assembly and the entire tube may be withdrawn through the opening in the top of fluid chamber 72, which opening is of course sufficiently large to permit passage of the upper end of the indicator tube, which is greater in area than the lower end. Replacement of the tube after cleaning is performed in the reverse fashion, as will be obvious.

Operation of a multi-stage meter based on that portion of the entire inventive concept heretofore described is diagrammatically illustrated in Fig. 8 of the drawings wherein tube assemblies Nos. 1, 2 and 3 are of the construction hitherto described and illustrated in Fig. 5. The assemblies of tubes Nos. 4, 5, 6 and 7 differ only in that there is no guide tube 88 with its cooperating elements in upper fluid chamber 72. In these tube assemblies a pin 98 is threaded into closure member 76 as shown. This pin extends down toward the fluted portion of tube 18 and serves to position a coil spring 100 which functions as a resilient upper stop member for the float within the tube. The reason for this difference in the upper tube assemblies is that where tubes of sufficiently large diameter and capacity are used there is enough area between the wall of the indicator float and the walls of the flutes or grooves at the upper extremity of the tube to permit flow of fluid into the upper fluid outlet chamber 72.

As clearly indicated in Fig. 8, a bank of successively larger tube assemblies is secured to a panel 102 in any desirable manner and their various inlet and outlet passages 36 and 70 hooked up in a manner now to be described. Each tube is provided with its own scale and the scale graduation runs consecutively through the several tubes with an overlap of indication marks whereby readings may be taken continuously along the aggregate scales.

The source of fluid flow is indicated by the arrow 104 and passes into a four-way fitting 106. From there flow may continue through conduit 108, conduit 110 which is controlled by valve No. 1, and conduit 112 which is controlled by valve No. 2. Where the volume of flow to be measured is not great, valves Nos. 1 and 2 are closed and the fluid passes into conduit 108, thence into the bottom fluid chamber 38 of tube No. 1, upwardly through tube No. 1 carrying the indicator float with it, and thence downwardly through the first cross conduit 114 which provides communication between the upper fluid chamber 72 of tube No. 1 and the lower fluid chamber 38 of tube No. 2. As clearly illustrated in the drawings, each cross conduit 114 connects the upper fluid chamber 72 of one tube with the lower fluid chamber 38 of the next succeeding tube.

Though the rate of flow may be insufficient to carry the indicator float in tube No. 1 up as far as the maximum reading on its scale, the fluid will continue to flow past the float and through each succeeding tube via cross conduits 114 until it reaches the upper fluid chamber of the last tube, here No. 7, and thence out through exhaust conduit 116.

Should the rate of flow be greater than can be measured in tube No. 1, the float indicator is carried to the top of the tube where it enters the sleeve 88 and seats against the resilient stop member heretofore described and associated with each of the tubes, in which position it is held by the fluid flow. The fluid flow then bypasses around the float, flows down through cross conduit 114 between tubes Nos. 1 and 2 and enters tube No. 2. In the embodiment here shown it is possible to measure fluid flow in this manner through the first four tubes. This marks what may be termed the first stage of the multi-stage indicator and of course includes the first three cross conduits 114.

When the resistance to fluid flow through the system has built up sufficiently within the tubes so that in order to obtain accurate measurement it is necessary to augment the fluid flow beyond what can pass through the smaller diameter tubes, this is accomplished by opening valve No. 1 in conduit 110, thereby permitting flow into the T-fitting 118 which is inserted in cross conduit 114 extending between the top of tube No. 4 and the bottom of tube No. 5. This supplemental flow augments the flow entering into the last mentioned cross conduit from the top of tube No. 4 and supports the flow for the second stage of metering.

The first stage in the embodiments illustrated herein, as heretofore stated, comprises the first four indicator tubes 18, the second stage comprises indicator tubes Nos. 5 and 6, wherein the operation is like that heretofore described, and the last stage in the embodiment illustrated comprises tube No. 7, and as the resistance builds up within the tubes it becomes necessary to open the third stage. This is accomplished by opening valve No. 2 permitting flow of more unresisted fluid through conduit 112 to another T-fitting 120 inserted in cross conduit 114 extending between the top of tube No. 6 and the bottom of tube No. 7. It should be noted that the feed from one tube to each successive tube is automatic. Exhaust in all stages is accomplished through conduit 116.

The association in the upper tube assembly of the first three indicator tubes of tube 88 and its associated parts permits, as has hitherto been explained, the indicator float to rise above the landed portion of the tube and provides openings through which flow may continue from the upper fluid chamber into the succeeding cross conduit 114. Where the size of indicator tube 18 is sufficiently large, the indicator float need not pass up into the upper fluid chamber of the tube assembly because sufficient clearance is provided between the bases of the flutes or grooves and the float side wall to permit the fluid to bypass the indicator float into the upper chamber and thence into its associated cross conduit.

The bleed valve arrangement associated with each lower fluid chamber 38 permits drainage of each tube following each run without loss of time and with minimum effort. By reason of the fact that the drainage opening is in direct vertical alignment with the axis of the tube bore, drainage is thorough and complete. It will be apparent that a multi-stage arrangement such as this permits measurement by one instrument of a wide range of fluid flow.

The embodiment disclosed in Figs. 9 and 10 of the drawings operates in precisely the same manner as has hitherto been described in conjunction with Fig. 8 and its elements are functionally the same. The tube installations in this embodiment are mounted in any suitable fashion in a casing broadly indicated by the numeral 122 in such manner that only the indicator tubes 18' and their cooperating graduated scales 33' are visible from the front of the assembly. Inlet and outlet passages 36' and 70' extend through or conduct fluid flow through a central panel 124 in the rear of which are arranged cross conduits 114' connecting the upper fluid chamber of each tube with the lower fluid chamber of the next succeeding tube. An upper skirt panel 126 depends from the upper front margin of the casing and obscures from view the upper tube assemblies. In like fashion a lower skirt panel 128 extends upwardly from the lower front margin of the casing to obscure from view the lower tube assemblies. Bleed valves 50 depend from the bottom wall of the casing and are readily accessible for their intended function.

In this embodiment fluid from the source enters the system at 104' which is coupled through a T-fitting with conduits 110' and 112', which latter are controlled by valves Nos. 1' and 2'. The valves for controlling staged flow are mounted on a side panel 130 in any suitable fashion and are manipulated at the time and for the purpose described more particularly with reference to the embodiment illustrated in Fig. 8. Valves Nos. 1' and 2' direct augmenting flow into the system through T-fittings 118' and 120' as heretofore described in detail.

What I claim:

1. In a fluid flow indicator, a plurality of upright transparent fluid passage tubes arranged in series and of different flow capacities and each tube having a fluid inlet at one end and a fluid outlet at the opposite end and a grooved inside wall face forming lands between the grooves which lands have inner faces that extend parallel to the axis of the bore and which grooves taper from top to bottom, a connection receiving the lower end of each tube, a fitting receiving the upper end of each tube, a conduit establishing fluid communication between the fitting at the top of each tube and the connection at the bottom of the succeeding tube, each fitting comprising a fluid chamber communicating with said tube and a passage between said chamber and the exterior of the fitting, and a guide tube corresponding in diameter to that of the landed portion of the transparent tube removably positioned in said fluid chamber and extending through the same into the top of said transparent tube, said guide tube including fingers at one end seated in the grooves of said transparent tube and providing slots therebetween extending beyond the end of the transparent tube for the passage of fluid from the transparent tube into the fluid chamber.

2. A large capacity fluid flow indicator comprising a series of indicator tubes of successively increasing capacity scaled continuously in succession of tubes, an indicator float within each tube, an intake passage to the bottom of the smallest tube, a fluid source inlet communicating with said intake passage, an exhaust passage from the top of the largest tube, and a cross conduit from the top of each tube to the bottom of each successive tube, each tube being an upright transparent tube having a fluid passage bore tapering in cross sectional area from top to bottom and provided with means guiding the float to follow a true axial path through the tube, and means for delivering a controlled flow of fluid from the inlet source into the bottom of an intermediate tube by-passing the tubes of less diameter than said intermediate tube.

3. A multi-stage fluid flow indicator comprising a series of indicator tubes of successively increasing capacity scaled continuously in succession of tubes, an indicator float within each tube, each tube being an upright transparent tube having a fluid passage bore tapering in cross sectional area from top to bottom and provided with means guiding the float to follow a true axial path through the tube, an intake passage to the bottom of the smallest tube, a fluid inlet source communicating with said intake passage, an exhaust passage from the top of the largest tube, a cross conduit from the top of each tube to the bottom of each successive tube, and means for augmenting the flow in an intermediate tube with fluid from the inlet source, comprising a controlled fluid conduit leading from the fluid inlet source into the bottom of an intermediate tube by passing the tubes of less diameter than said intermediate tube.

4. A multi-stage fluid flow indicator comprising a series of indicator tubes of successively increasing capacity scaled continuously in succession of tubes, each tube being an upright transparent tube having a fluid passage bore tapering in cross sectional area from top to bottom and provided with means guiding the float to follow a true axial path through the tube, an indicator float within each tube, an intake passage to the bottom of the smallest tube, a fluid inlet source having fluid communication with said intake passage, an exhaust passage from the top of the largest tube, a cross conduit from the top of each tube to the bottom of each successive tube, means for separately augmenting the flow from the inlet source by controlled amounts delivered into a plurality of intermediate tubes by passing all tubes of lesser diameter, and independently operable means for controlling the augmenting flow to each of said intermediate tubes.

5. A multi-stage fluid flow indicator comprising a series of flow meter tubes of successively increasing capacity scaled continuously in succession of tubes, each flow meter tube being an upright transparent tube having an interiorly linearly grooved portion defining lands between the grooves the inner faces of which lands extend parallel to the axis of the bore through the tube, the fluid flow passageway defined by the grooves within the tube tapering from top to bottom, a fluid responsive float mounted within each tube for movement along an axial line therethrough as guided by said lands, a fitting receiving the lower end of each tube defining a fluid chamber communicating with the interior of the tube and having a fluid inlet, a fitting receiving the upper end of each tube defining a fluid chamber communicating with the interior of the tube and having a fluid outlet, a fluid intake leading to the inlet of the lower fitting of the smallest diameter tube, a fluid exhaust leading from the outlet of the upper fitting of the largest diameter tube, a sleeve within the chamber of the upper fittings of certain of the tubes of lesser diameter superposing the upper ends of the tubes received within said fittings, each of said sleeves having a plurality of spaced apart fingers received within the upper end of the tube, said fingers being turned outwardly at their lower ends and seated within the grooves in the tube, each sleeve defining an inside diameter equal to that defined by the land portion of the tube with which the sleeve is associated, a cross conduit extending between the upper fitting of each tube and the lower fitting of the next succeeding tube in line, and a valve controlled fluid conduit extending from the intake to a cross conduit leading to the lower fitting of one of the intermediate tubes by passing the tubes of smaller diameter.

6. A fluid flowmeter comprising a plurality of upright transparent fluid passage tubes of successively increasing capacity arranged in series, a fluid intake communicating with the bottom of the smallest tube in the series, a fluid outlet leading from the top of the largest tube in the series, a cross conduit leading from the top of each tube to the bottom of the succeeding tube in the series, each tube having a scaled intermediate fluid passage bore portion tapering in cross-sectional area from top to bottom, an indicator float mounted within each tube to travel through its bore, means within each tube guiding the float to follow a true axial path through the bore, means for delivering fluid into a cross conduit extending from the top of one tube in the series to the bottom of the succeeding tube in the series by-passing the tubes of less diameter than the tube into which the cross conduit discharges, the first tube in the series having a fluid chamber superimposing and communicating with the scaled bore portion and provided with a float guide adapted to guide the float and permit it to rise above the scaled portion of the bore.

7. A fluid flowmeter comprising a plurality of upright transparent fluid passage tubes of successively increasing capacity arranged in series, a fluid intake communicating with the bottom of the smallest tube in the series, a fluid outlet leading from the top of the largest tube in the series, a cross conduit leading from the top of each tube to the bottom of the succeeding tube in the series, each tube having a scaled intermediate fluid passage bore portion tapering in cross-sectional area from top to bottom, an indicator float mounted within each tube to travel through its bore, means within each tube guiding the float to follow a true axial path through the bore, means for delivering fluid into a cross conduit extending from the top of one tube in the series to the bottom of the succeeding tube in the series by-passing the tubes of less diameter than the tube into which the cross conduit discharges, certain of the tubes in the series which are of less diameter than other tubes in the series being provided with means permitting their floats to have a guided rise therein above the scaled tapered portion of the bores of the tubes.

8. A fluid flow indicator comprising a plurality of upright transparent fluid passage tubes of successively increasing capacity arranged in series, each tube having a scaled intermediate fluid passage bore portion tapered in cross-sectional area from top to bottom, an indicator float mounted within the scaled portion of each tube for travel therethrough, means within each tube guiding the float to follow a true axial path through the bore of the tube, a fluid chamber fitting communicating with and superimposing the upper end of the tapered scaled bore of each tube, a fluid chamber connection communicating with the lower end of the tapered scaled bore of each tube, a fluid inlet leading into the fluid chamber connection of the smallest tube of the series, a fluid outlet leading from the fluid chamber fitting of the largest tube of the series, a cross conduit leading from the fluid chamber fitting at the upper end of each tube to the fluid chamber connection at the lower end of the next succeeding tube, and means for delivering fluid into a cross conduit leading from one intermediate tube into the succeeding tube by-passing the tubes of less diameter.

9. A large capacity fluid flow indicator comprising a series of indicator tubes of successively increasing capacity scaled continuously in succession of tubes, an indicator float within each tube, an intake passage to the bottom of the smallest tube, a fluid source inlet communicating with said intake passage, an exhaust passage from the top of the largest tube, and a cross conduit from the top of each tube to the bottom of each successive tube, each tube being an upright transparent tube having a fluid passage bore tapering in cross sectional area from top to bottom and provided with a plurality of linearly extending circumferentially spaced apart lands the inner faces of which extend parallel to the axis of the bore and constitute means guiding the float to follow a true axial path through the tube, and means for delivering a controlled flow of fluid from the inlet source into the bottom of an intermediate tube by-passing the tubes of less diameter than said intermediate tube.

CLAUDE E. COX.